United States Patent [19]

Brooks, Sr.

[11] Patent Number: 5,000,296
[45] Date of Patent: Mar. 19, 1991

[54] SELF-ADJUSTING VEHICLE WHEEL DRUM BRAKE WITH MULTIPLE PAWL STEP
[75] Inventor: Frank W. Brooks, Sr., Dayton, Ohio
[73] Assignee: General Motors Corporation, Detroit, Mich.
[21] Appl. No.: 398,366
[22] Filed: Aug. 24, 1989
[51] Int. Cl.⁵ .............................................. F16D 65/56
[52] U.S. Cl. ........................... 188/79.56; 188/196 BA; 74/577 M
[58] Field of Search ............... 188/79.56, 79.63, 79.64, 188/196 B, 196 BA; 74/577 M

[56] References Cited
U.S. PATENT DOCUMENTS
3,358,794 12/1967 Ayers, Jr. ......................... 188/79.56
3,941,215 3/1976 Schoch ..................... 188/196 BA X
4,502,574 3/1985 Spaargaren ............. 188/196 BA X FOREIGN PATENT DOCUMENTS
2257520 11/1972 Fed. Rep. of Germany ...... 188/196 BA Primary Examiner—Duane A. Reger
Attorney, Agent, or Firm—Ernest E. Helms

[57] ABSTRACT

In a preferred embodiment a self-adjusting vehicle wheel drum brake is provided having an adjuster strut with a threadably extending star wheel and an adjuster pawl mechanism having a dual step tip. The dual step tip allows the adjuster mechanism to move the adjuster pawl in small incremental steps, thereby lowering in half or in close approximate thereto, the amount of wear required upon a pair of brake shoes before the adjuster pawl will effectuate outward movement of the brake shoes.

2 Claims, 1 Drawing Sheet

SELF-ADJUSTING VEHICLE WHEEL DRUM BRAKE WITH MULTIPLE PAWL STEP

FIELD OF THE INVENTION

The field of the present invention is that of apparatuses and methods of utilization thereof of automotive drum brakes with self-adjusting shoes.

DISCLOSURE STATEMENT

It is known in the art to provide automotive drum brakes with self-adjusting brake shoes. An understanding of a conventional self-adjusting automotive brake can be gained by a review of "Theory and Diagnosis Manual Brake Systems", April 1987 Delco Moraine, pages 4-22, 4-23, 4-24 and 4-25. Additionally, an understanding of automotive self-adjusting drum brakes can be gained by review of copending commonly assigned U.S. patent application Ser. No. 295,273 Hyde et al.

Due to the down sizing of vehicles to meet government fuel economy standards, drum brakes have increasingly been designed to be smaller thereby contributing less weight to the vehicle. The reduction in the size of the drum brake has accordingly required a reduction in size of most of the major components of the drum brake. Prior adjuster strut mechanisms utilize a pivotal pawl which is attached to one of the shoes which acts upon an adjuster strut with a threadably mounted rotative star wheel. As the brake shoes wear the pawl will pivot, imparting angular rotation to elongate the adjuster strut, thereby adjusting the brake shoes outward to position them more adjacent to the drum.

It is desirable to provide a self-adjusting brake wherein the adjuster can make very fine adjustments to compensate for the wear of the shoes to ensure maximum brake efficiency. The major technique to provide for more discreet adjustment in prior brake mechanisms was to have a large diametric star wheel with a plurality of gear-like teeth. Since movement of the adjuster pawl tip, along the star wheel gear teeth sets the length of extension of the adjuster strut, the more teeth that a star wheel has along its circumference, the more discrete will be the adjustment. However, there are two limiting factors which are involved when trying to make fine adjustments. The first limiting factor is the size of the star wheel. Reduction in the size of the brake can necessitate a reduction in the diameter of the star wheel. Secondly, the addition of more teeth to the star wheel causes two problems, one being that there is a greater manufacturing cost. Secondly, and more important, the fine teeth will provide a tendency for the adjuster tip to skip over them, thereby not effectuating the desired adjustment.

SUMMARY OF THE INVENTION

The present invention provides a self-adjusting vehicle wheel drum brake which provides a very fine resolution of a adjustment superior to that previously available. The present invention provides a self-adjusting vehicle wheel drum brake having an adjuster strut with a threadably extending star wheel very similar to those previously provided. Additionally, the present provides an adjuster pawl mechanism having a multiple, or in the preferred embodiment, dual step tip. The dual step tip allows the adjuster mechanism to move the adjuster pawl in small incremental steps, thereby lowering in half or in close approximate thereto, the amount of wear required upon the brake shoes before the adjuster pawl will effectuate outward movement of the brake shoes.

It is an desire of the present invention to provide an apparatus and method of utilization thereof of a self-adjusting drum brake having fine incremental adjustment.

Further objects, desires and advantages of the present invention can become more apparent to those skilled in the art as the nature of the invention is better understood from the accompanying drawings and a detailed description.

DETAILED DESCRIPTION OF THE DRAWINGS

Figure 1:
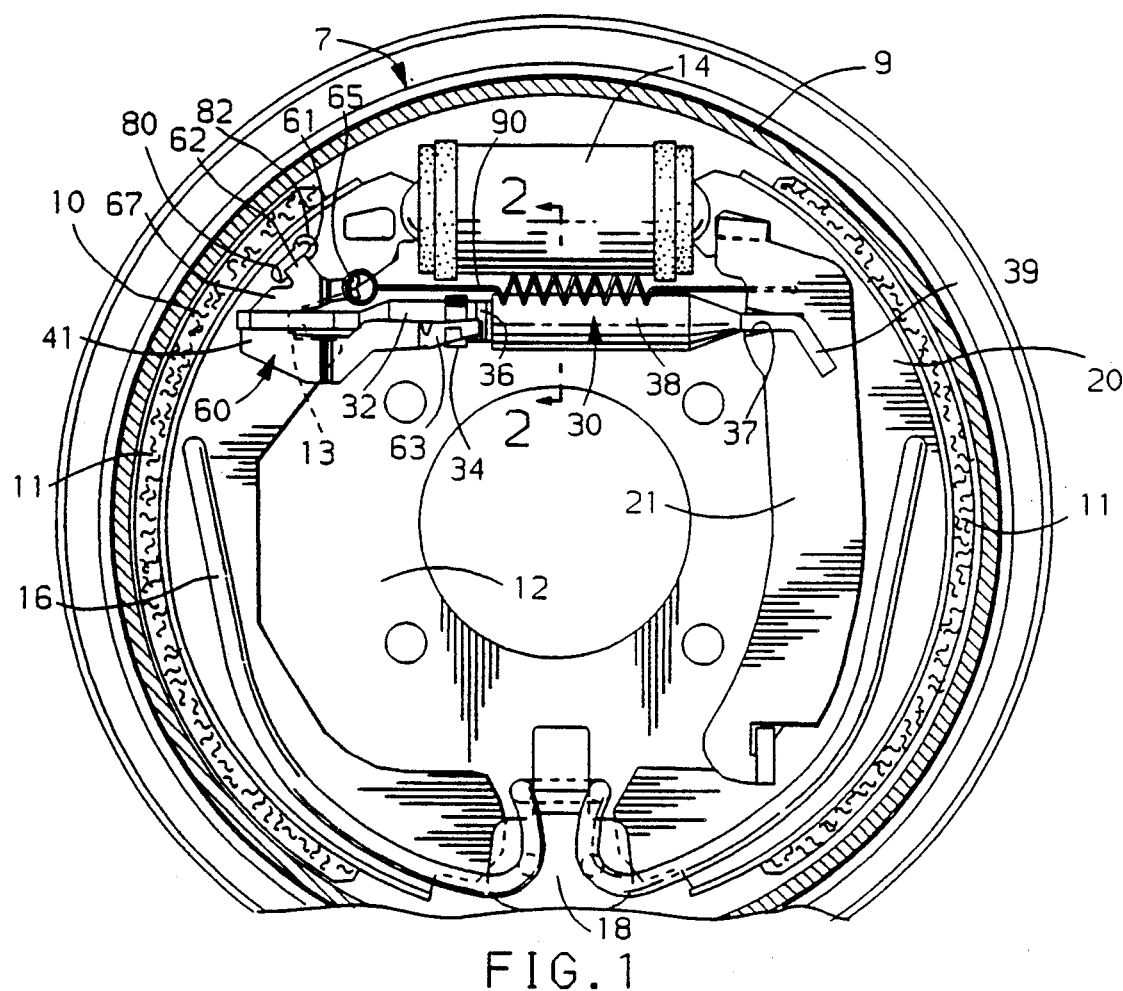
FIG. 1 is a plane elevational view of a preferred embodiment brake according to the present invention.

Referring to FIGS. 1, 2, 3 and 4, the drum brake 7 according to the present invention is associated with a drum 9 (shown in section) which is fixably connected with the wheel (not shown) of a vehicle. The drum brake 7 also has a backing plate 12 which is boltably connected to a flange of the axle housing (not shown) of the vehicle. As shown is FIG. 1, the plate 12 is adapted for connection to the rear axle of the vehicle. Drum brake 7 is a leading trailing type brake. However, the present invention can be utilized on other drum brakes such as dual servo. Drum brake 7 has a primary (leading or front) shoe 10 and a secondary (trailing or rear) shoe 20.

In contact with the brake shoes 10, 20 and mounted by the plate 12 is a wheel cylinder 14. Also connected with the brake shoes 10, 20 is a horse shoe return spring 16. For movement of the brake shoes 10, 20 outward, the wheel cylinder 14 is actuated. The brake shoes 10, 20 pivot with relationship to the plate 12 by virtue of a bottom anchor 18. The return of the primary and secondary shoes after the wheel cylinder 14 has been relieved is accomplished by the horse shoe return spring 16. Each brake shoe is also mounted with to the back plate 12 the horse shoe return spring 16. In an alternative embodiment (not shown), the brake shoes can be held to the back plate 12 by a hold down cup and spring.

Adjustably setting the distance between the brake shoes 10, 20 along the upper end is an adjuster strut 30. The adjuster strut 30 has at one end a head 32 with a rotatably mounted star wheel 34. The star wheel 34 is fixably connected with a bolt 36. The bolt 36 is threadably received in an inner threaded sleeve nut 38 and rotation of the bolt 36 via the star wheel 34 causes the bolt 36 to be threadably removed from the threaded nut 38. The threaded nut 38 has two fingers 39 (only one shown) which capture the webbing of the secondary brake shoe 20 and a parking brake lever 21 and fit within slots 37 of the same. In like manner the head 32 has two fingers 41 (only one shown) which capture the webbing of the primary brake shoe 10 and fit within a slot 13 of the primary brake shoe (FIG. 1).

Figure 4:
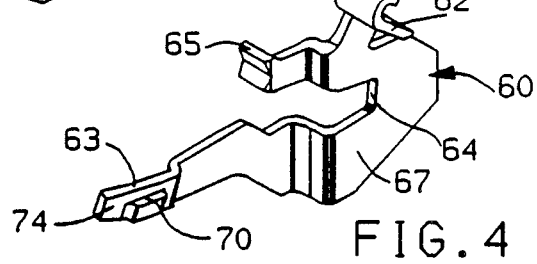
FIG. 4 is a perspective view of the adjuster pawl utilizing the brake shown in FIG. 1.

To turn the star wheel 34 upon actuation of the brakes by the wheel cylinder 14 there is provided an adjuster pawl 60. The adjuster pawl 60 has a tip 63 for making contact with the star wheel 34. The adjuster pawl 60 is also captured between the fingers 41 of the adjuster strut head and makes contact with the webbing between the fingers 41 same surface 64 (FIG. 4). The adjuster pawl 60 as illustrated has a flaring 62 projecting generally perpendicular from the main body 67 of the adjuster pawl 60. The primary shoe 10 has an aperture 80 for receipt of the inserted flaring 62 of the adjuster pawl with a pivotal contact surface 82 for a rounded portion 61 of the adjuster pawl flaring 62. The contact surface 82 allows the adjuster pawl 60 by its flaring 62 to be pivotally mounted with respect to the primary brake shoe 10.

A coil spring 90 is connected between a pawl tab 65 and the secondary 20 brake shoe above the adjuster strut 30 and provides a compliant means of biasing of the adjuster pawl 60 against the star wheel 34. The spring 90 biases the adjuster pawl 60 to push upward and inward (as shown by the arrows 91 and 93 of FIG. 2) on the star wheel 34. The biasing force in the direction of the arrow 93 is caused by tab 65 being further outward from the plate 12 than the point of connection of the spring 90 with the second shoe 20. It is noted that the spring 90 aids the return spring 16.

Figure 2:
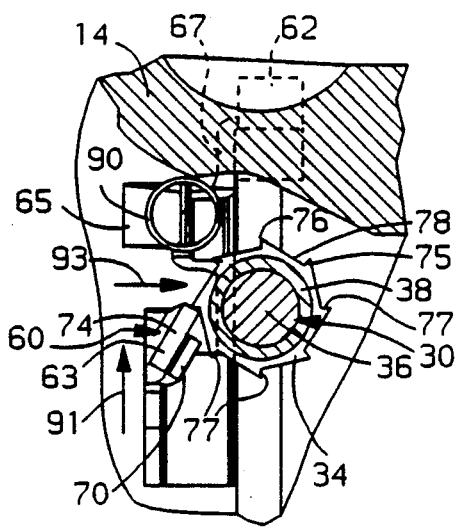
FIG. 2 is a view taken along line 2—2 of FIG. 1.

In operation the adjuster strut 30 will be set at the factory to determine the minimum distance between the primary 10 and secondary 20 brake shoes when the wheel cylinder 14 is not actuated. Upon actuation of the brake 7 when the vehicle is moving in a predetermined direction (in the embodiment shown in either direction) the primary 10 and secondary 20 shoes will be pushed outward by the wheel cylinder 14 causing the shoe linings 11 to contact the wheel drum 9. If adjustment of the brake 7 is not necessary, the adjuster pawl 60 which is spring biased against the star wheel 31 will pivot tip 63 upward a slight or insignificant amount since the adjuster pawl surface 64 is in contact with the webbing between the fingers 41 of the strut head. Therefore, the star wheel 34 will not be rotated. However, as the linings 11 become worn, the adjuster pawl surface 64 will be further away from the webbing between fingers 41 of the strut head 65 allowing the spring 90 to cause the adjuster pawl 60 to pivot upwards as shown (FIGS. 2 and 3).

Figure 3:
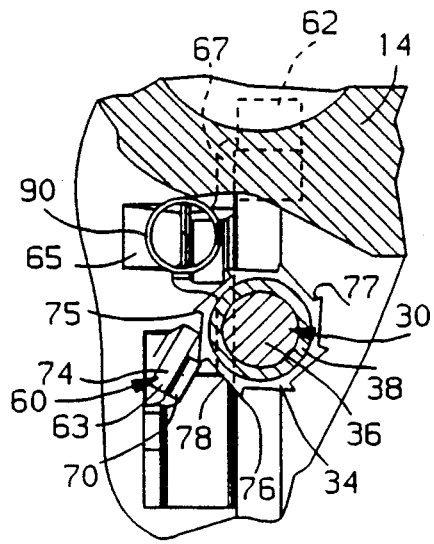
FIGS. 3 is a view similar to that of FIG. 2 illustrating the operation of the adjuster pawl.

When the linings become worn enough that adjustment is necessary, the adjuster pawl tip 63 will initially hit the star wheel 34 on the bottom or lower tip (first) step 70 (FIG. 3). The star wheel teeth 75 (for clarity of illustration the star wheel 34 is shown with 8 teeth thereby providing an angular pitch of 45 degrees, however, 20 teeth/18 degree angular pitch (would be more typical) have a generally radial projecting surface 77 ending at a peak 76. From tip 76 the star wheel 34 has a generally inclined surface 78 which slopes radially inwardly. Step 70 will initially abuttingly contact the peak 76 (FIG. 3) with a step 74 resting against the surface 78. Both steps 70 and 74 are inclined inward towards the face plate 12. As wear of the friction linings of the shoes continues, the step 70 will contact radial projecting surface 77 and will rotate the star wheel 34 a first predetermined angular range of approximately 9 degrees. As wear of the shoe 10, 20 linings continue, the step 74 will fall off of the surface 78 at a peak 76. (It should be noted that as step 70 was hitting surface 77, and step 74 was riding on surface 78, the pawl 60 was being pushed opposite the direction of the arrow 93 [radially outward] against the action of the spring 90.) Therefore after the peak 76, the pawl under bias of the spring 90 will force the peak 76 to a position to hit the next surface 77 (FIG. 2). The step 74 will continue to hit surface 77 until the star wheel 34 has moved a second predetermined angular distance usually equal to the first predetermined angular range until the step 70 makes contact with the next surface 77.

With the multiple dual step tip adjuster pawl 60, adjustment can be made in finer increments since the peak 76 will not have to move for as large of an angular range before it is impacted upon the tip 63 for rotation. Prior to the present invention, the angular movement of the adjuster pawl (resultant of the wear of the friction linings) was greater in order to cycle the tip to the next star wheel tooth.

It will be apparent to those skilled in the art that the present invention can work without the adjuster pawl being pivotally mounted with respect to the shoe 10 by the pawl flaring 62.

While an embodiment of the present invention has been explained, it will be readily apparent to those skilled in the art of the various modifications which can be made to the present invention without departing from the spirit and scope of this application as it is encompassed by the following claims.

The embodiments of the invention in which an exclusive property or privilege is claimed are defined as follows:

1. A self-adjusting vehicle wheel drum brake, said brake in combination comprising:
    a primary and a secondary shoe;
    a wheel cylinder for moving said shoes to actuate or to release said brake;
    an adjuster strut including a star wheel with a plurality of teeth each said tooth having a predetermined pitch, said strut adjustably extending the distance between said shoes; and
    an adjuster pawl pivotally mounted with respect to one of said shoes, said adjuster pawl having a tip with two slanted steps for contact with said star wheel whereby movement of said shoes a predetermined distance in a predetermined direction causes said first step to abuttingly contact a tooth of said star wheel to turn said star wheel a predetermined angular range approximately equal to one half of the pitch of one of said wheel teeth while said second step rides on said tooth, and wherein after said second step of said adjuster pawl tip abuttingly contacts said same tooth of said star wheel to turn said star wheel a second predetermined angular range approximately equal to one half of the pitch of one of said wheel tooth.

2. A method of adjusting a vehicle wheel drum brake including a primary and secondary shoe, said method in combination comprising:
    moving said primary and secondary shoes to actuate or relieve the same with a wheel cylinder;
    adjustably extending the distance between said shoes with an adjuster strut including a rotative star wheel with a plurality of teeth with a predetermined pitch;
    contacting one of said teeth of said star wheel with an adjuster pawl with a first and second steped tip, said first-step abuttingly contacting a tooth of said wheel moving said wheel a predetermined angular range approximately equal to one half of the pitch of said wheel while said second step is riding on said wheel tooth, moving when said shoes move a predetermined distance in a predetermined direction; and abuttingly contacting said star wheel tooth with said second step moving said star wheel a predetermined angular range approximately equal to one half of the pitch of said wheel teeth when said shoes move a predetermined distance and in a predetermined direction, thereby adjusting the distance between said shoes.

* * * * *